US007906220B2

(12) United States Patent
Hattori et al.

(10) Patent No.: US 7,906,220 B2
(45) Date of Patent: Mar. 15, 2011

(54) STEEL/ALUMINUM WELDED STRUCTURE

(75) Inventors: Yasunori Hattori, Sakai (JP); Tadaaki Miono, Sakai (JP); Atsushi Andoh, Sakai (JP); Tetsu Iwase, Fujisawa (JP); Seiji Sasabe, Fujisawa (JP)

(73) Assignee: Nisshin Steel Co., Ltd., Hyogo (JP)

( * ) Notice: Subject to any disclaimer, the term of this patent is extended or adjusted under 35 U.S.C. 154(b) by 353 days.

(21) Appl. No.: 10/573,635

(22) PCT Filed: Sep. 27, 2004

(86) PCT No.: PCT/JP2004/014545
§ 371 (c)(1),
(2), (4) Date: Mar. 28, 2006

(87) PCT Pub. No.: WO2005/030424
PCT Pub. Date: Apr. 7, 2005

(65) Prior Publication Data
US 2007/0111022 A1    May 17, 2007

(30) Foreign Application Priority Data
Sep. 29, 2003  (JP) ................................. 2003-336641

(51) Int. Cl.
*B32B 7/00*      (2006.01)
*B32B 15/01*     (2006.01)
*B32B 15/18*     (2006.01)
*B32B 15/20*     (2006.01)

(52) U.S. Cl. .......................... 428/653; 428/654; 428/681

(58) Field of Classification Search .................. None
See application file for complete search history.

(56) References Cited

U.S. PATENT DOCUMENTS 4,003,766 A * 1/1977 Ito et al. .......................... 148/24
4,729,929 A * 3/1988 Shinoda et al. ............... 428/653

(Continued)

FOREIGN PATENT DOCUMENTS

JP    06-039588    2/1994

(Continued)

OTHER PUBLICATIONS

JP 2005-319481 English Machine Translation, Hattori et al, Nov. 2005.*

(Continued)

*Primary Examiner* — Jennifer C McNeil
*Assistant Examiner* — Jason L Savage
(74) *Attorney, Agent, or Firm* — The Webb Law Firm

(57) ABSTRACT

A steel/aluminum welded structure comprises a hot-dip Al-coated steel sheet 1 spot welded with an aluminum or aluminum alloy sheet 2. The steel sheet 1 is coated with a coating layer 4 containing, by mass, 3-12% of Si and 0.5-5% of Fe. An area ratio of an Al—Fe binary alloy layer, formed at the joint boundary, is controlled to 90% or less. An unalloyed region 9 exists between an Al—Fe—Si ternary alloy layer 6 at an interface of a steel substrate 5 with the coating layer 4 interface and the Al—Fe binary alloy layer at the joint boundary. A steel substrate 5 preferably contains 0.002-0.020% of N for formation of a N-enriched surface layer in contact with the coating layer 4. The N-enriched layer impedes propagation of the brittle Al—Fe binary alloy layer to the whole of the joint boundary and raises joint strength of the steel/aluminum welded structure.

4 Claims, 2 Drawing Sheets

U.S. PATENT DOCUMENTS

| | | | |
|---|---|---|---|
| 4,891,274 A * | 1/1990 | Higuchi et al. | 428/653 |
| 4,913,785 A * | 4/1990 | Uchida et al. | 205/193 |
| 5,789,089 A * | 8/1998 | Maki et al. | 428/623 |
| 2001/0016268 A1* | 8/2001 | Maki et al. | 428/653 |
| 2004/0009366 A1* | 1/2004 | Takagi et al. | 428/653 |

FOREIGN PATENT DOCUMENTS

| | | |
|---|---|---|
| JP | 07-090460 | 4/1995 |
| JP | 09-220692 | 8/1997 |
| JP | 09-228018 | 9/1997 |
| JP | 2002-256407 | 9/2002 |
| JP | 2003-033885 | 2/2003 |

OTHER PUBLICATIONS

JP 2003-145278 English Machine Translation, Iwase et al, May 2003.*

JP 05-065503 English Machine Translation, Maejima et al, Mar. 1993.*

Korean Office Action dated Apr. 27, 2007.

* cited by examiner

FIG.1A
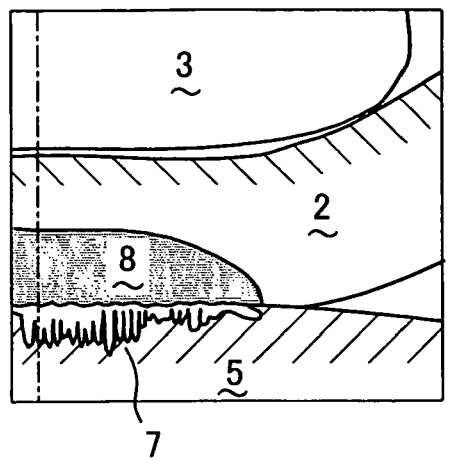
FIG.1B
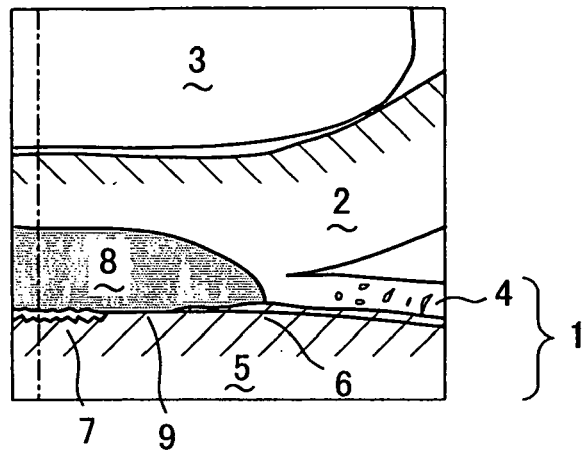
FIG.2
| weld cycle time | peripheries of nuggets | centers of nuggets |
|---|---|---|
| 1 | Si:3.1%, Fe:35.6% | Si:1.7%, Fe:37.6% |
| 3 | | Si:0.9%, Fe:40.8% |
| 6 | | Si:0.8%, Fe:46.0% |
$1\,\mu m$

STEEL/ALUMINUM WELDED STRUCTURE

BACKGROUND OF THE INVENTION

1. Field of the Invention

The present invention relates to welded steel/aluminum structures, having characteristics both of aluminum and steel, i.e. lightness and corrosion-resistance of aluminum as well as high strength of steel.

2. Description of Related Art

Aluminum material such as aluminum metal and aluminum alloys has been used in various fields due to lightness and corrosion-resistance. When such aluminum material is used as a member to be subjected to mechanical stress, the aluminum member is necessarily thickened to satisfy a demand for strength. However, the thickening is incompatible with the merit (lightness) of the aluminum member and also with a compact design of an objective structure.

The demand for strength can be attained by lining the aluminum member with a steel part good of mechanical strength without necessity of thickening. Mechanical bonding method, e.g. bolting, riveting or claw clamping, has been employed so far for the lining, although it is improper for formation of a strong joint and inferior of productivity. If an aluminum part is integrated with a steel part by welding, steel/aluminum structures excellent in various properties are provided with productivity remarkably higher than the mechanical bonding method. However, when the aluminum part is integrated with the steel part by a conventional melt welding process, brittle intermetallic compounds are massively formed at a joint boundary, resulting in a significant decrease of joint strength.

Such intermetallic compounds are diffusion reaction products of atoms between steel and aluminum parts. Generation of the intermetallic compounds is suppressed by proper control of welding conditions such as a reaction temperature and a welding time, which affect the atomic diffusion, during friction-welding, as noted in JP 2003-33885A. However, the friction-welding puts significant restrictions on joint designs and rather complicated as compared with other welding processes, resulting in poor productivity. A spot-welding process is also employed for fabrication of steel/aluminum structures. For instance, a hot-dip Al-coated steel sheet is resistance-welded with an aluminum part, as noted in JP 6-39588A.

It is generally thought that a hot-dip Al-coated steel sheet shows similar behaviors to an aluminum part during welding, due to presence of an Al coating layer on its surface. But, a surface part to be welded is heated at a high temperature above a melting temperature (660° C.) of Al during spot-welding. The high-temperature heating causes formation of a molten Al, to which Fe and Si are diffused from an Al—Fe—Si ternary alloy layer at an interface between the steel substrate and the coating layer. Fe is re-precipitated at a cooling step of welding, while Si is distributed to a whole of the molten Al due to its high diffusivity. Consequently, a weld joint has a nugget, wherein a brittle Al—Fe binary alloy layer is formed at a whole area of a joint boundary, resulting in a significant decrease of weld strength.

Unfavorable effects of the Al—Fe binary alloy layer on weld strength are suppressed by controlling a share of a joint boundary occupied by intermetallic compounds. According to a process proposed by JP 2003-145278A, generation of a heat is preferentially performed at a hot-dip Al-coated steel during spot-welding, by holding the steel part and an aluminum part at positive and negative sides, respectively, in order to suppress formation of the intermetallic compounds. However, massive formation of the intermetallic compounds is still unavoidable.

SUMMARY OF THE INVENTION

The present invention aims at provision of a steel/aluminum welded structure excellent in weld strength. Improvement of the weld strength is achieved by proper control of Fe and Si contents in an Al coating layer so as to suppress growth of an Al—Fe binary alloy layer. Quantitative effects of Fe and Si on growth of the Al—Fe alloy layer are discovered by inventors' researches and investigations on behaviors of Fe and Si, which are diffused to a molten Al and then re-precipitated during spot-welding.

The present invention proposes a steel/aluminum welded structure formed by spot-welding an aluminum sheet and a hot-dip Al-coated steel sheet together. The hot-dip Al-coated steel sheet has a coating layer, which has a chemical composition of, by mass, 3-12% Si, 0.5-5% Fe and the balance being substantially Al, on its surface. A share of a joint boundary occupied by an Al—Fe binary alloy layer is controlled to a value not more than 90% by an area ratio. There is an Al—Fe alloy free region between an Al—Fe—Si ternary alloy layer, which is formed at an interface between a steel substrate and the coating layer before welding, and a Al—Fe binary alloy layer at a joint boundary after welding.

BRIEF DESCRIPTION OF THE DRAWINGS

FIG. 1A is a schematic view illustrating a sectional structure of a spot-weld joint between a common steel sheet and an aluminum alloy sheet.

FIG. 1B is a schematic view illustrating a sectional structure of a spot-weld joint between a hot-dip Al-coated steel sheet and an aluminum alloy sheet.

FIG. 2 is a diagram showing effects of weld cycle times during spot-welding on shapes of weld nuggets formed between aluminum alloy sheets and steel sheets having N-enriched surface layers coated with hot-dip Al-coating layers.

DETAILED DESCRIPTION OF THE INVENTION

Figure 3:
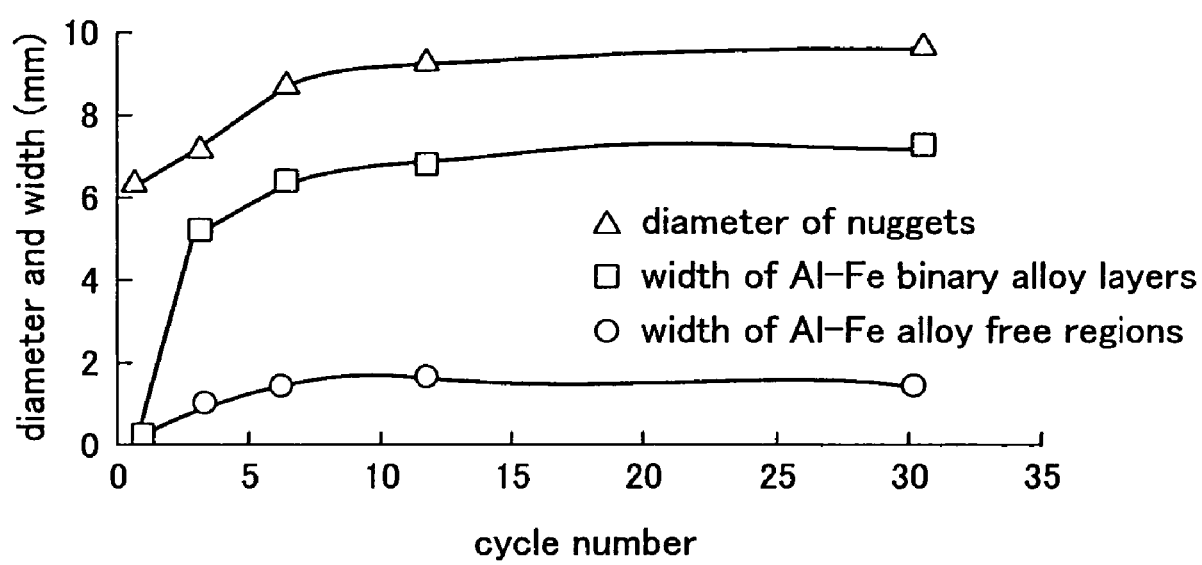
FIG. 3 is a graph showing effects of weld cycle times on diameters of weld nuggets, widths of Al—Fe alloy free regions and widths of Al—Fe binary alloy layers.

The features of the present invention will be more clearly understood from the following explanation referring to the drawings.

In order to spot-weld a hot-dip Al-coated steel sheet 1 to an aluminum sheet 2, the aluminum sheet 2 is laid on the steel sheet 1 and clamped between electrodes 3, as shown in FIGS. 1A and 1B. The sheets 1 and 2 are pressed together with a pressure of 3 kN, for instance, and a welding current of 15-25 kA is applied to the sheets 1, 2 at 3-40 weld cycle times. The aluminum sheet 2 and an Al coating layer 4 are melted by Joule heat and fused together by mutual diffusion at a joint to be welded.

Fe and Si are dissolved in molten Al from an Al—Fe—Si ternary alloy layer 6, which is formed at an interface between a steel substrate 5 and the Al coating layer 4. Dissolution of Fe and Si leads to disappearance of the Al—Fe—Si ternary alloy layer 6 at an welded part. Dissolution of Fe also occurs from the steel substrate 5 to the molten Al. Fe, which is once dissolved in the molten Al, re-precipitates at a cooling step of welding, resulting in formation of a brittle Al—Fe binary alloy layer 7 at the welded part. When the Al—Fe binary alloy layer 7 is grown up over a whole interface, weld strength of a nugget 8 is significantly reduced, as shown in FIG. 1A. On the other hand, a weld joint, wherein the coating layer 4 firmly adheres to the steel substrate 5 through the Al—Fe alloy free region 9 unless the Al—Fe binary alloy layer 7 is grown up over a whole interface, maintains its welded state, as shown in FIG. 1B. The weld strength becomes higher as expansion of the Al—Fe alloy free region 9.

According to researches on manufacturing conditions suitable for formation of the weld joints, as shown in FIG. 1B, the inventors have discovered that formation of an Al—Fe binary alloy layer at the joint boundary is significantly influenced by a chemical composition of a coating layer formed on a steel substrate. In short, a steel sheet, which is hot-dip coated with an Al coating layer containing 3-12% Si and 0.5-5% Fe, is suitable as a steel part to be spot-welded with an aluminum part, in order to form such an unalloyed region 9 for improvement of weld strength.

The effects of Si and Fe in the Al coating layer on formation of the Al—Fe binary alloy layer is probably explained, as follows:

The Al—Fe binary alloy layer is originated in dissolution of Fe in molten Al, which is formed by weld heat during spot-welding, and then re-precipitation of Fe from the molten Al at a cooling step of spot-welding. A dissolution rate of Fe is varied in correspondence with concentration difference of Fe between the steel substrate and the coating layer. The dissolution rate of Fe becomes faster as an increase of the concentration difference of Fe (in other words, as an decrease of concentration of Fe in the coating layer). The dissolved Fe remains near the steel substrate 5 due to its relatively small diffusivity, and so re-precipitates as a massive Al—Fe binary alloy layer at a cooling step of spot-welding. The behaviors of Fe predicts that an increase of Fe concentration in the coating layer 4 advantageously suppresses dissolution of Fe from the steel substrate 5 into the molten Al and so formation of the Al—Fe binary alloy layer.

In fact, when steel sheets 1 coated with coating layers 4 containing 0.5% or more of Fe are spot-welded to aluminum sheets 2, Al—Fe binary alloy layers are observed at centers of weld nuggets 8, but unalloyed regions 9 are detected with less dissolution of Fe at peripheries of weld nuggets 8, where a quantity of a heat input is relatively small, as recognized in the examples described later. The increase of Fe concentration is suitable for formation of the unalloyed region 9, but excess Fe rather reduces weld strength. Excess Fe is also unfavorable due to its harmful effects on the other properties, e.g. corrosion-resistance and formability, of the hot-dip Al-coated steel sheet. Therefore, Fe concentration in the coating layer 4 is determined within the range of 0.5-5%.

Fe diffusion from the steel substrate 5 to the molten Al is also suppressed by formation of an diffusion-inhibitor layer at an interface between the steel substrate 5 and the coating layer 4. A N-enriched layer, which is proposed by JP 9-228018A for brazing Al-coated steel sheets, is suitable for the purpose. The N-enriched layer reduces dissolution of Fe from the steel substrate 5 into the molten Al and so remarkably reduces a brittle Al—Fe binary alloy layer. Consequently, an excellent joint strength is imparted to a welded structure.

An Al—Fe—Si ternary alloy layer disappears from an interface between the steel substrate 5 and the coating layer 4, when Si with diffusivity larger than Fe is diffused from the Al—Fe—Si ternary alloy layer 6 to the molten Al by a weld heat during spot-welding. The diffusion of Si to the molten Al is retarded by raising Si concentration at 3-12% or so in the coating layer 4, so as to ensure adhesiveness of the coating layer 4 to the steel substrate 5 without disappearance of the Al—Fe—Si ternary alloy layer at a part other than a weld joint. A decrease of the Al—Fe binary alloy layer is noted as an increase of Si concentration, resulting in improvement of weld strength.

Base steel sheets for hot-dip coating may be low-carbon steel, medium-carbon steel, low-alloyed steel or stainless steel. Such an element as Si, Mn, Cr, Ni or Al may be alloyed to the steel, as occasion demands. Especially, a steel sheet containing 0.002-0.020% N is preferable for the purpose, in order to form a N-enriched layer for suppressing diffusion between Al and Fe. As for the N-containing steel, an Al content is controlled less than 0.03% to keep effective N necessary for formation of the N-enriched layer.

When a base steel sheet is immersed in an Al bath and raised from the bath, a molten coating metal is lifted from the bath by upward movement of the steel sheet and then solidified to a coating layer. The coating layer is conditioned to a predetermined thickness by injection of a wiping gas to the steel sheet just after raised from the bath. Although growth of the Al—Fe binary alloy layer is more retarded as the coating layer is thicker, a thickness of the coating layer is preferably controlled within a range of 5-70 μm in order to assure good formability.

Si and Fe contents of the hot-dip coating layer are controlled to 3-12% and 0.5-5%, respectively, in order to fabricate a steel/aluminum composite structure with good weld strength. The values of Si and Fe contents are concentrations of Si and Fe in the coating layer 4 except an alloyed layer, which is formed at an interface between a steel substrate 5 and the coating layer 4. Other elements, e.g. Ti, Zr, B, Cr and Mn, may be optionally added to the coating layer 4, in response to demands for characteristics other than weldability.

In the case where a base steel sheet contains 0.002-0.020% N, the steel sheet is subjected to heat-treatment in succession to hot-dip coating, so as to form a N-enriched layer at a boundary between a steel substrate and an alloyed layer. Since the N-enriched layer with N concentration of 3.0 atomic % or more surprisingly suppresses diffusion between Al and Fe, the N-containing steel sheet is suitable as a steel part of the inventive steel/aluminum welded structure. The effect of the N-enriched layer on suppression of the diffusion between Al and Fe becomes stronger as an increase of a N content in the base steel sheet if the heat-treatment is performed under the same conditions after hot-dip coating. However, excess N above 0.02% rather worsens productivity of a steel sheet itself.

Most of aluminum and aluminum alloy sheets are used as an aluminum part of the inventive steel/aluminum welded structure without any special restrictions, as far as they are wrought alloys.

Fe in the aluminum material also has the same effect, i.e. suppression of formation and growth of an Al—Fe binary alloy layer, as Fe in the coating layer, but the effect is fairly weaker. Therefore, a Fe content in the aluminum material is preferably controlled at a value of 1.0% or less, to ensure corrosion-resistance, formability and other characteristics.

An aluminum alloy, which contains 3.0% or less (especially 1% or so) Si and 0.1-1.5% Mg, can be strengthened by heat-treatment such as aging to precipitate fine $Mg_2Si$ particles. The effect of $Mg_2Si$ particles on improvement of strength is noted at a Si content not less than 0.1%. The aluminum material is also solution-hardened by addition of Mg at a ratio of 1.5-6%. Since these effects are realized by 0.1-6% of Mg and 3.0% or less of Si, Mg and Si contents are properly determined at values within the specified ranges in response to demands for strength. However, excess Mg above 6% causes occurrence of weld defects during spot-welding, and excess Si above 3.0% often causes formation of coarse precipitates in an aluminum matrix, resulting in a decrease of weld strength.

The inventive welded structure is fabricated by sizing a hot-dip Al-coated steel sheet and an aluminum sheet to predetermined shape, overlapping the sized sheets together, and then spot-welding the overlapped sheets with a predetermined pitch. Welding conditions are determined in combination of a welding current with a welding time (ordinarily represented by weld cycle times). Weld strength is generally raised as an increase of a welding current. A weld joint with tensile shear strength of 3 kN or more is formed by controlling a welding current to 12 kA or more at 12 weld cycle times, or by 5 or more weld cycle times at a welding current of 25 kA.

EXAMPLE 1

A cold-rolled steel sheet (containing 0.04% C, 0.01% Si, 0.20% Mn, 0.01% P, 0.007% S, 0.010% Al and 120 ppm N) of 1.0 mm in thickness was hot-dip coated with an Al coating layer of 20 μm in thickness containing 9.2% Si and 1.8% Fe. The steel sheet was heated 15 hours at 450° C. after hot-dip coating, to form a N-enriched layer (N concentration of 5 atomic %) at an interface between the steel substrate and the Al coating layer. An Al—Fe—Si ternary alloy layer (containing 10.9% Si and 35.8% Fe) was also formed other than the N-enriched layer at the interface between the steel substrate and the Al coating layer.

The hot-dip coated steel sheet was spot-welded with an aluminum alloy (containing 0.11% Si, 0.25% Fe, 5.52% Mg, 0.35% Cu, 0.02% Cr and 0.01% Zn) sheet of 1.0 mm in thickness under the following conditions.

Test pieces, which were sampled from the hot-dip coated steel sheet and the aluminum alloy sheet, were degreased, washed, overlapped together and clamped between coupled electrodes of a spot welder. The electrodes were copper alloy tips of 16 mm in diameter with a 40 mm radius of the top ends. The test pieces were pressed with 3 kN and spot-welded together with a welding current of 25 kA at most by 12 weld cycle times. In this case, 12 weld cycle times corresponded to $12/60$ (=1/5) second, since power frequency was 60 Hz.

Observation points were determined at a center of a weld nugget and a position inwards in 1.5 mm from a periphery of the weld nugget, to investigate change of a sectional structure of a joint boundary in correspondence with weld cycle times. Alloy layers at the joint boundary were observed by a scanning electron microscope SEM-EDX (offered as Type 840A by JEOL Ltd.).

It is noted from observation results in FIG. 2 that a Al—Fe—Si alloy layer was partially diffused to molten Al at both a center and a periphery of a nugget by one weld cycle time. The Al—Fe—Si alloy layer had Si concentration of 3.1% at the periphery of the nugget, but Si concentration was decreased to 1.7% at the center of the nugget. On the other hand, there were no substantial fluctuations of Fe concentration even at the periphery of the nugget, except a slight increase at the center of the nugget.

The Al—Fe—Si alloy layer at the periphery of the nugget almost completely disappeared after three weld cycle times, while the alloy layer at the center of the nugget was detected. Disappearance of the Al—Fe—Si alloy layer means dissolution of the Fe and Si alloy to molten Al. The alloy layer at the center of the nugget contained 0.9% Si and 40.8% Fe. The lower Si content and the higher Fe content prove that the alloy layer is a Al—Fe binary alloy layer, which was newly formed after disappearance of the Al—Fe—Si ternary alloy layer.

After current flow was further repeated 6 cycles, no alloy layer was substantially detected at a joint boundary at the center of the nugget. But, a Al—Fe binary alloy layer with 0.8% of Si and 46.0% of Fe was grown up to a thick layer at the joint boundary at the center of the nugget.

The weld joint, which was formed by the specified spot welding as the above, had the structure that the Al—Fe alloy layer at the center of the nugget was surrounded with an unalloyed region 9 (in FIG. 1B) and further with the Al—Fe—Si alloy layer.

Diameter of the nugget, width of the Al—Fe alloy free region and width of the Al—Fe binary alloy layer increased with the increase of weld cycle times up to 5 cycles. By 5 or more weld cycle times, each width also showed an almost constant width (as shown in FIG. 3). The weld joint, which was formed by 5 or more weld cycle times, had tensile shear strength (TSS) of 3.5 kN or more as an evaluation by a tensile shear test regulated by JIS Z3136. The tensile shear strength is satisfactorily high for the purpose, since it is similar or superior to a value of a weld joint between aluminum parts.

Although tensile shear strength is a representative value for evaluating properties of a weld joint in general, a bimaterial joint has the joint boundary, which often includes intermetallic compounds brittle along a peel load direction. In this sense, joint strength along the peel load direction is meaningful for judging industrial applicability of the weld joint. Such joint strength is measured by a cross tension test. The joint had cross tension strength (CTS) of 1.5 kN. The measurement value is similar or superior to a value of a weld joint between aluminum parts.

For comparison, a hot-dip Al-coated steel sheet, which had a coating layer with small Fe content (0.3%) formed on its surface, was spot-welded to an aluminum sheet under the same condition. In this case, an Al—Fe binary alloy layer was formed over a whole of a welded plane, so that a weld joint had extremely low tensile shear strength of 2.5 kN and low crosswise tensile strength of 1.0 kN. Due to the poor strength, a welded structure was inappropriate for a practical use.

In the case where a hot-dip Al-coated steel sheet, which had a coating layer containing excess Fe (6.1%) formed on its surface, was spot-welded to an aluminum sheet under the same condition, a weld joint with tensile shear strength of 3.0 kN or more and cross tension strength of 1.0 kN or more were not formed, either.

EXAMPLE 2

A cold-rolled steel sheet (0.05% C, 0.1% Si, 0.25% Mn, 0.012% P, 0.006% S and 0.006% Al) was hot-dip coated with an Al alloy layer. Compositions of a coating bath and hot-dip coating conditions were changed so as to vary Si contents in four levels, i.e. 1.8%, 3.5%, 9.2% and 15.6%, and Fe contents in five levels, i.e. 0.2-0.3%, 0.7-0.9%, 1.8-2.3%, 3.9-4.5% and 5.5-6.1%.

An Al alloy sheet (0.10% Si, 0.22% Fe, 2.67% Mg, 0.01% Cu, 0.19% Cr, 0.02% Mn, 0.01% Zn and the balance Al) was used as an opposite part.

Test pieces sampled from the hot-dip Al-coated steel sheet and the Al alloy sheet were degreased, washed, overlapped together and then spot-welded by an alternating-current welder at 60 Hz with a welding current of 19 kA and 12 weld cycle times, using a Cu alloy tip of 16 mm in diameter with a 75 mm radius of its top end.

The spot-welded steel/aluminum structure was subjected to the same tensile shear test and the same cross tension test as in Example 1 for measuring joint strength.

It is understood from results in Table 1 that the steel and aluminum sheets are spot-welded together with high joint strength, i.e. tensile shear strength of 3 kN or more and cross tension strength of 1.5 kN or more, by properly controlling Si and Fe contents to 3-12% and 0.5-5%, respectively, in an hot-dip coating layer.

As decreases of Si and Fe contents, a joint boundary was shared by an Al—Fe binary alloy layer at a larger area rate, and its joint strength was less than 3 kN by tensile shear strength or less than 1.0 kN by cross tension strength. Cracks, which propagated through the alloy layer, were detected at a joint boundary, which was broken by the tensile test. These results prove that the joint strength was weakened by the existence of an Al—Fe binary alloy layer.

An area rate of the Al—Fe binary alloy layer became smaller as increases of Si and Fe contents. But excess Si and Al were improper for joint strength. The decrease of joint strength in this case is probably caused by brittle fracture at the weld joint due to excess Si and Al.

TABLE 1

Quantitative Effects of Si and Fe of Coating Layers on Joint Strength

| Concentration (mass %) | | Area rate of Al—Fe alloy Layers at joint boundary | Tensile shear strength | Cross tension strength CTS | |
|---|---|---|---|---|---|
| Si | Fe | (%) | TSS (kN) | (kN) | Note |
| 1.8 | 0.2 | 100 | 2.7 | 0.7 | Comparative example |
|  | 0.9 | 100 | 2.7 | 0.9 | " |
|  | 2.3 | 100 | 2.6 | 0.9 | " |
|  | 4.5 | 100 | 2.6 | 1.0 | " |
|  | 5.5 | 100 | 2.7 | 0.7 | " |
| 3.5 | 0.2 | 98 | 2.8 | 1.0 | " |
|  | 0.8 | 85 | 3.3 | 1.5 | Inventive example |
|  | 1.8 | 77 | 3.7 | 1.8 | " |
|  | 3.9 | 70 | 4.0 | 2.0 | " |
|  | 5.7 | 70 | 2.7 | 1.0 | Comparative example |
| 9.2 | 0.3 | 98 | 2.8 | 1.0 | " |
|  | 0.8 | 83 | 3.4 | 1.5 | Inventive example |
|  | 2.1 | 75 | 3.9 | 1.9 | " |
|  | 4.1 | 70 | 4.1 | 2.0 | " |
|  | 5.8 | 70 | 2.6 | 1.0 | Comparative example |
| 15.6 | 0.2 | 93 | 2.8 | 0.7 | " |
|  | 0.7 | 84 | 2.6 | 0.9 | " |
|  | 2.1 | 75 | 2.7 | 0.9 | " |
|  | 4.3 | 72 | 2.7 | 0.8 | " |
|  | 5.7 | 73 | 2.7 | 0.8 | " |

EXAMPLE 3

Steel sheets, hot-dip coated with an Al alloy (9.2% Si, 4.1% Fe) coating layer, were spot-welded to various aluminum alloy sheets under the same conditions as in Example 1. Each spot-welded steel/aluminum structure was subjected to a tensile shear test and a cross tension test for measurement of joint strength.

It is noted from results in Table 2 that control of Mg and Si within ranges of 0.1-6.0% and 3.0% or less, respectively, in aluminum alloy sheets ensures fabrication of welded structures excellent in tensile shear strength and cross tension strength.

The joint strength of the welded structure is also influenced by Fe contents of the aluminum alloy sheets. In fact, tensile shear strength of 4.0 kN or more and cross tension strength of 1.6 kN or more were achieved by controlling Fe less than 1.0%, as noted in Nos. 2 and 4.

TABLE 2

Effects of Chemical Compositions of Al Alloys on Strength of Welded Structure

| Sample No. | Alloying elements (mass %) | | | Tensile shear strength TSS (kN) | Cross tension strength CTS (kN) |
|---|---|---|---|---|---|
| | Mg | Si | Fe | | |
| 1 | 0.05 | 1.00 | 0.40 | 3.1 | 1.3 |
| 2 | 2.50 | 0.25 | 0.40 | 4.3 | 1.9 |
| 3 | 6.50 | 1.00 | 0.40 | 3.3 | 1.5 |
| 4 | 0.60 | 1.00 | 0.40 | 4.3 | 2.0 |
| 5 | 0.60 | 3.30 | 0.40 | 3.3 | 1.4 |
| 6 | 0.60 | 1.00 | 1.20 | 3.2 | 1.4 |

INDUSTRIAL APPLICABILITY OF THE INVENTION

The welded structure, proposed by the invention as mentioned the above, has the joint boundary that a brittle Al—Fe binary alloy layer generated at a center of a nugget is surrounded with an Al—Fe alloy free region for inhibiting propagation of the Al—Fe binary alloy layer to the whole of the Fe/Al interface. A ratio of the Al—Fe binary alloy layer to the joint boundary is suppressed to 90% or less, by surface area. Since the brittle Al—Fe binary alloy layer is less propagated at the joint boundary, steel and aluminum parts were firmly welded together. As a result, advantages both of steel and aluminum are imparted to various welded structures, e.g. structural members of automobiles and heat exchangers.

The invention claimed is:

1. A steel/aluminum welded structure comprising:
    a hot-dip Al-coated steel sheet having a coating layer, consisting of, by mass, 3-12% Si, 0.5-5% Fe and the balance being Al except inevitable impurities, and an Al—Fe—Si ternary alloy layer formed at an interface between a steel substrate and the coating layer; and
    an aluminum or aluminum alloy sheet spot welded to the Al-coated steel sheet;
    wherein an area ratio of an Al—Fe binary alloy layer to a whole of an Al/Fe joint boundary is controlled to 90% or less, and an Al—Fe alloy free region exists between the Al—Fe binary alloy layer and the Al—Fe—Si ternary alloy layer, and wherein the coating layer is formed on a steel substrate containing 0.002-0.020% N, and the coating layer is formed on a N-enriched surface of the steel substrate, N concentration of the N-enriched surface being 3.0% or more, by atom.

2. The steel/aluminum welded structure of claim 1, wherein:
    the aluminum or aluminum alloy sheet contains Fe at a content of not more than 1.0%.

3. The steel/aluminum welded structure of claim 2, wherein:
    the aluminum alloy sheet contains 0.1-6.0% of Mg and 3.0% or less of Si.

4. The steel/aluminum welded structure of claim 1, wherein:
    the aluminum alloy sheet contains 0.1-6.0% of Mg and 3.0% or less of Si.

* * * * *

UNITED STATES PATENT AND TRADEMARK OFFICE
CERTIFICATE OF CORRECTION

PATENT NO. : 7,906,220 B2
APPLICATION NO. : 10/573635
DATED : March 15, 2011
INVENTOR(S) : Hattori et al.

Page 1 of 1

It is certified that error appears in the above-identified patent and that said Letters Patent is hereby corrected as shown below:

Title Page, See Item (73) Assignee: "Nisshin Steel Co., Ltd., Hyogo (JP)"
should read:
-- Nisshin Steel Co., Ltd., Tokyo (JP) and Kobe Steel Ltd., Hyogo (JP) --

Signed and Sealed this
Eighteenth Day of October, 2011

David J. Kappos
*Director of the United States Patent and Trademark Office*